United States Patent [19]

Hickman

[11] 4,397,243
[45] Aug. 9, 1983

[54] CONVERTIBLE HIGHWAY RAILROAD VEHICLE

[75] Inventor: Albert F. Hickman, Eden, N.Y.

[73] Assignee: A. F. Hickman Associates, Inc., Trumansburg, N.Y.

[21] Appl. No.: 239,503

[22] Filed: Mar. 2, 1981

[51] Int. Cl.³ .................... B60F 1/04; B61F 13/00
[52] U.S. Cl. .................... 105/159; 105/215 C; 104/32 R; 280/415 B
[58] Field of Search .............. 105/159, 215 C, 215 R, 105/199 R, 199 C, 220, 4 A, 4 R, 3, 355, 189, 453; 104/122, 18, 19, 20, 21, 32 R, 32 A; 280/478 R, 408, 415 R, 415 B, 423 A, 423 B, 423 R, 28.5; 410/53, 45

[56] References Cited

U.S. PATENT DOCUMENTS

| | | | |
|---|---|---|---|
| 2,066,836 | 1/1937 | Hughes | 105/3 |
| 3,286,654 | 11/1966 | Fisher | 105/215 C |
| 3,610,168 | 10/1971 | Macomber | 105/159 |
| 3,985,369 | 10/1976 | O'Leary | 280/432 |
| 4,128,062 | 12/1978 | Roberts | 105/199 C |
| 4,364,315 | 12/1982 | Beatty | 105/159 |

FOREIGN PATENT DOCUMENTS

| | | | |
|---|---|---|---|
| 56-157610 | 12/1981 | Japan | 105/159 |
| 163009 | 6/1922 | United Kingdom | 105/453 |

*Primary Examiner*—Robert B. Reeves
*Assistant Examiner*—Donald Hajec
*Attorney, Agent, or Firm*—Harold I. Popp

[57] ABSTRACT

A highway trailer has an underframe of side walking beams, to which it is pivotally connected on a horizontal transverse axis. These walking beams can be mounted on, preferably with a nesting fit, the main longitudinal side frame members of a railroad truck so that the trailer can be lifted from and dropped onto the railroad truck by gravity. Such can be accomplished by arranging a highway track at a straddling higher elevation than a railroad track and providing the railroad track with up and down ramps. With the trailer overlaying and connected to move along with the railroad truck, the latter rises into mating relation therewith on ascending the up-ramp. When disconnected, the railroad truck drops from the trailer on descending the down ramp. In mating, the highway walking beams enter the space defined by the main longitudinal side frame members of the railroad truck, and the rubber tired highway wheels are arranged, freely suspended, exteriorly of the railroad truck.

Subordinate features are in a spring suspension between the load and the pivotal connection to the walking beams; the provision of upright wedge faces at the ends of the walking beams and main longitudinal railroad side frame members so that they interfit, preferably snugly, even when encountering slight longitudinal misalinement; and permitting the highway truck to swivel about a central vertical axis throughout all normal railroad travel, but being positively latched against such swiveling throughout all highway travel.

24 Claims, 26 Drawing Figures

Fig. 6.

CONVERTIBLE HIGHWAY RAILROAD VEHICLE

This invention relates to a vehicle which is convertible to both highway and railroad service to be propelled by conventional rubber tired highway tractors and conventional flanged railroad wheeled locomotives.

BACKGROUND OF THE INVENTION

Various proposals have been made to permit a train of vehicles to be driven a long distance over railroad tracks on their own railroad wheels; the train split up; and then picked up, individually, by highway tractors and distributed to various places near the freight yard.

In many of these the vehicle has both railroad and highway wheels and mechanisms for selectively substituting one for the other. This involves carrying heavy railroad equipment, particularly in wheels and axles, along the highway which greatly reduces the permissible payload. The present inventor has proposed removing the one type of wheels and substituting the other type and having a removable dolly at the front end for railroad service.

SUMMARY OF THE INVENTION

The cargo container frame is permanently mounted on a truck carrier by axles having rubber tires for highway service. It also has another truck carried by axles having flanged wheels for railroad service. The railroad wheeled truck can be fitted to and is removable from the highway wheeled truck. By this arrangement the railroad wheeled truck can be removed and does not enter into highway service and subtract from the legal highway payload.

The railroad wheeled truck frame has light main longitudinal upwardly opening channel walking beams at each side which snugly fit the bottoms of the highway wheeled longitudinal frame side beams, which also serve as walking or compensating beams. The frame or walking beams for the railroad wheeled truck form tension members for the main longitudinal side frame walking beams of the highway wheeled truck, to permit lighter weight for both.

For rail service, the railroad wheeled truck is tandem axled and the highway wheeled truck has a central turn plate which permits the truck and axles to swivel about a vertical central axis along track curves and switches. This turn plate is rendered inoperative in highway service.

For safety, in railroad service the railroad wheeled truck can also be latched to the highway wheeled truck.

The highway wheeled truck also has a spring suspension adapted for both highway and railroad service. It includes friction-free helical compression springs acting, in series, through vertical friction plates. The friction provided by the plates controls rebound action in both services and eliminates the need for shock absorbers.

The railroad wheeled truck includes axle housings supporting the truck or walking beams. The axle housing ends can be journalled on the railroad wheels, as by roller bearings. Each pair of railroad wheels is compelled to rotate in unison through a floating axle in the axle housing. Such tieing together of railroad wheels to rotate in unison is a most important requirement, in railroad service, in reducing flange wear and also track wear at curved and switches. Such flange wear leads to rail climbing and possible derailment.

Preferably the change to highway service is effected wholly by gravity by movement over a pit into which the railroad wheeled truck descends and is left behind. Such railroad wheeled truck can also be picked up and automatically attached to the highway wheeled truck by connecting it, by a grapple hook or the like, to the vehicle passing over the pit. The "pit" provides two levels of trackage and hence an elevated structure could obviously be substituted.

The invention also comprehends, in such gravity change to rail service, a highway track straddling and at a higher elevation than the railroad track with an up-ramp for the railroad track. A railroad truck can be placed on the depressed railroad track; a cargo highway truck, loaded with a cargo container, can be moved on the elevated highway track to a position above the railroad truck; and the highway truck and railroad truck can be coupled to move together, so that further movement of the highway truck along the track draws the railroad truck up the up-ramp into interengaging supporting relationship to the highway truck and its cargo. With such load transfer the coupling can be removed and a train formed for railroad travel. The railroad truck supports only the rear end of the cargo container, so that before being fully converted to railroad travel, a railroad wheeled dolly must be coupled in supporting relation to the front end of the cargo container.

A reverse of the above is provided for the gravity conversion from railroad to highway service. Thus a down railroad ramp is provided at the entering end of the depressed railroad track section. Any safety locks between the interengaged railroad wheeled truck and its supported highway wheeled truck can be unlatched, so that when brought down the down ramp the railroad wheeled truck drops free from the highway wheeled truck and the highway wheels of the highway truck brought down onto the elevated highway track which straddles the depressed railroad track. Freed from the railroad wheeled truck, the cargo container, supported at its rear end by the highway wheeled truck, and at its front end by a railroad wheeled dolly is hauled off. Its front end railroad wheeled dolly is then replaced by a conventional highway tractor and driven off to its destinations.

A feature of the invention resides in the railroad track in the interchange pit being in three stations at two different levels so that the railroad truck goes down a pair of down ramps and goes up a pair of up-ramps in effecting interchange. This has been found needed to effect unhindered gravity separation and interengagement of the highway and railroad trucks. Obviously such ramps could be in the straddling highway tracks, or combinations of highway and railroad ramps could be used.

GENERAL COMPONENTS

The cargo containers or bodies A are propelled along the highways B by a conventional highway tractor C having the usual slotted, tiltable, greased plate of a conventional fifth wheel, this plate having a conventional latch for seizing the downwardly projecting pin of any standard highway tractor. As such, the highway tractor C can be used with any ordinary highway trailer when not in service with the equipment of the present invention.

These containers or bodies A are propelled along standard railroad tracks D by one or more diesel locomotives E. These locomotives can be coupled to each other and to the front railroad dolly F of the foremost container or body A by a suitable coupling G which is shown in simplified form.

Figure 5:
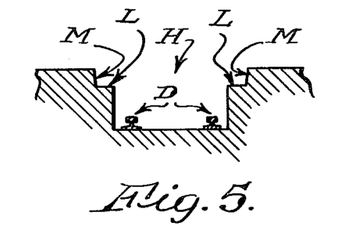
FIG. 5 is a vertical transverse section through this pit taken generally on line 5—5, FIG. 3.

A siding of the track D, as shown in FIGS. 3-5 and 10, is in a pit H in which the rear railroad truck J of each container or cargo body A is dropped off when converting to highway use. Also in this pit H, when converting to railroad use, each rear railroad truck J is picked up and mated with the rear highway truck K, the latter being permanently connected to the rear end of a container or body A. For this purpose the track D in this pit H is at progressively different levels below the regular run of the railroad track D and also below the highway B. Along opposite sides of the pit H the tires of the tractor C, and also the tires of the rear highway truck K of each cargo body or container A, travel along a curbed driveway L, the inside of which driveway forms the longitudinal rim of the pit H, as best shown in FIG. 5, and the outside of which is bounded by curbs M. These curbs compel the rubber tired components to travel in centered relation to the pit H and its railroad track D. It will be seen that the highway tracks L straddle the pit H and the railroad track therein.

Each railroad truck J is placed in and removed from this pit H by a small tractor (not shown).

The first railroad track level in the pit H is designated as station N and is connected to the in end of the regular railroad track D by a down ramp 30. The lowest track level in the pit H is designated at O and is connected to the track of station N by another down ramp 31. The next track level in the pit H is designated at P and is at the same level as the track of station N and is connected to the track of station O by an up-ramp 32. It is also connected to the regular railroad track D by a final up-ramp 33.

Along the highways, the rear end of each container or body A is supported by a permanently connected rubber tired highway truck K, the front end being removably supported on a highway tractor C.

In the following description the designations "front" and "rear" ends of parts refer to the direction of travel along the railroad and highway.

CHASSIS FRAME Q—PARTICULARLY FIGS. 6-10 AND 16-19

Figure 16:
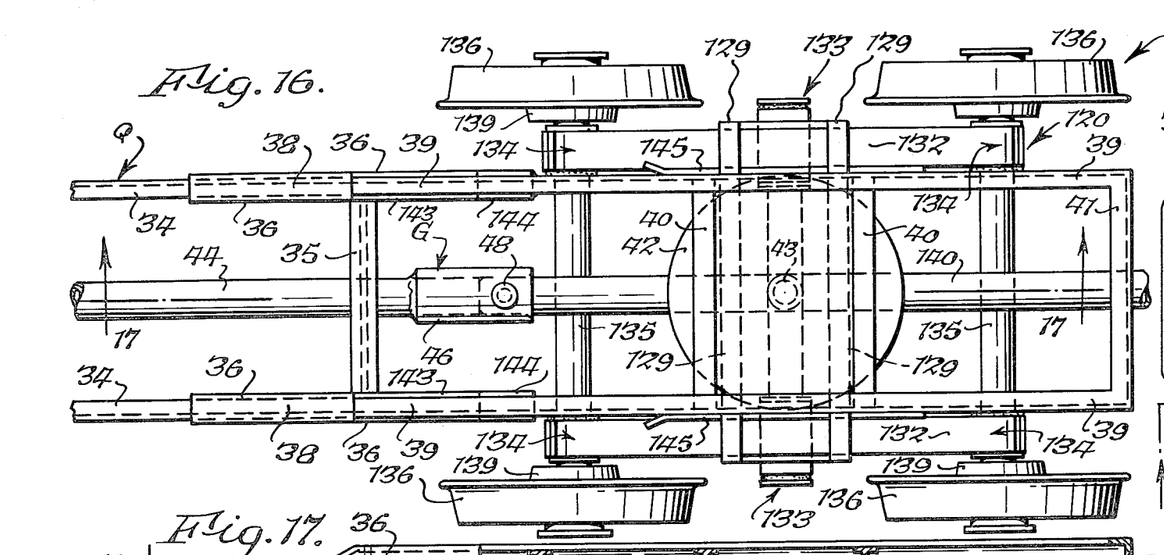
FIG. 16 is a top plan view of the rear end of the railroad dolly supporting the front end of the load carrying chassis.

The containers or bodies A for transporting cargoes are shown in the form of box bodies carried by a chassis frame Q. This chassis frame Q has two main longitudinal side frame beams 34 connected together at intervals by cross beams 35. Referring to FIG. 16 now, a pair of vertical longitudinal plates 36 are welded to the inner and outer sides of the forward end of each main longitudinal side frame beam 34 to project upwardly therefrom. Each pair of these side plates 36 are preferably cross-connected by a top 38 to form an inverted U. Between the upper parts of each pair of these plates 36 is welded a horizontal channel beam 39 to project forwardly therefrom in the direction of travel. These are connected at intervals by cross I-beams 40 and at their forward extremities by a cross channel beam 41. These beams jointly provide an elevated rear end for the chassis frame Q. To the underside of this elevated rear end is secured a horizontal fifth wheel plate 42 having a downwardly facing greased surface and a depending central, headed latch pin 43. This fifth wheel plate and its pin are identical to the corresponding parts of a conventional fifth wheel connection between a highway tractor C and its conventional trailer (not shown).

The I-beam cross beams 35 of the lower rear part of the chassis frame Q are penetrated by and welded to a central longitudinal horizontal backbone tube 44. The front end of this tube is arranged near where the chassis frame Q rises to form its elevated front end, and is connected by another coupling G with the rear end of the similar horizontal central backbone tube 140 of a dolly F to form the backbone of a train. These couplings G can be of any form and is shown, simplified, as a sleeve 46 welded to one backbone tube end and which receives the other backbone tube end, and a tapered pin 48 inserted downwardly through registering holes in these mated parts.

It will be seen that these end coupled tubes provide a very strong, yet light structure extending the length of the train of wheeled vehicles to transmit heavy longitudinal forces. Each tube is reinforced against bending under such forces by being welded to the spaced cross beams which they penetrate and which cross beams are in turn welded to main longitudinal side frame beams of the wheeled vehicles.

REAR HIGHWAY TRUCK K—PARTICULARLY FIGS. 6-10, 13 AND 14

Each chassis Q is permanently mounted on a rear highway tractor K through a tandem axle highway suspension including a pair of tandem axles. The front tandem axle is designated at 49 and the rear tandem axle at 50, and each in turn is supported at its opposite ends by wheels 51. These wheels rotatably support these axles and each includes a rubber tire 52. These wheels can be single or dual tired wheels.

The construction of the tandem axle spring suspension at the right hand side of the rear highway truck K is substantially the same as the construction at the left hand side thereof. Hence a description of the suspension will be deemed to apply to both sides the same numerals being employed. Each end of each of the axles is connected by a rubber bushed bearing, indicated generally at 53, to one end of a horizontal walking beam 54 which forms the major component of the highway truck frame. Each frame walking beam 54 is arranged below, but outside of, its main longitudinal side chassis beam 34 and is of rectangular welded tubular form in cross section, the top compression wall being shown of triple thickness and the bottom tension wall of the double thickness. The opposite transverse end walls 55 of each frame walking beam 54 converge downwardly to provide downwardly wedging ends nesting in the frame of the rear railway truck J as hereinafter described.

The bottom half bearing housing 59 for each axle end is shown as secured to the triple thickness top wall of each frame walking beam 54. A rubber bushing 60 around each axle end nests in each bottom half bearing housing 59. A top half bearing housing 61 holds each rubber bushing 60 in compressive relation with its axle end.

At its center each frame walking beam 54 is connected by a rubber bushed bearing, indicated generally at 62, to the corresponding end of a cylindrical cross rod in the form of a tube 63 insert which extends transversely of the line of travel.

While each rubber bushed bearing 62 can be of any suitable construction, as best shown in FIGS. 6, 6A, 7, 10 and 13, each comprises a pair of spaced abutment rings 64 welded to each end of the horizontal cross rod or journal means 63 and confining between them a rubber bushing 65 which embraces the cross rod. The bottom of the periphery of each rubber bushing is compressively embraced by a semicylindrical bottom half bearing housing 66 and the top of the periphery of each rubber bushing is compressively embraced by an upper semicylindrical half bearing housing 67 suitably secured to its lower half bearing housing. Each upper half bearing housing 67 can be reinforced by a strap welded thereto. In order to accommodate the displacement of the rubber bushings resulting from such compression, the opposite ends of the half bearing housings 66 and 67 are in spaced relation to the abutment rings 64 welded to the cross rod 63.

Figures 10, 11, 12:
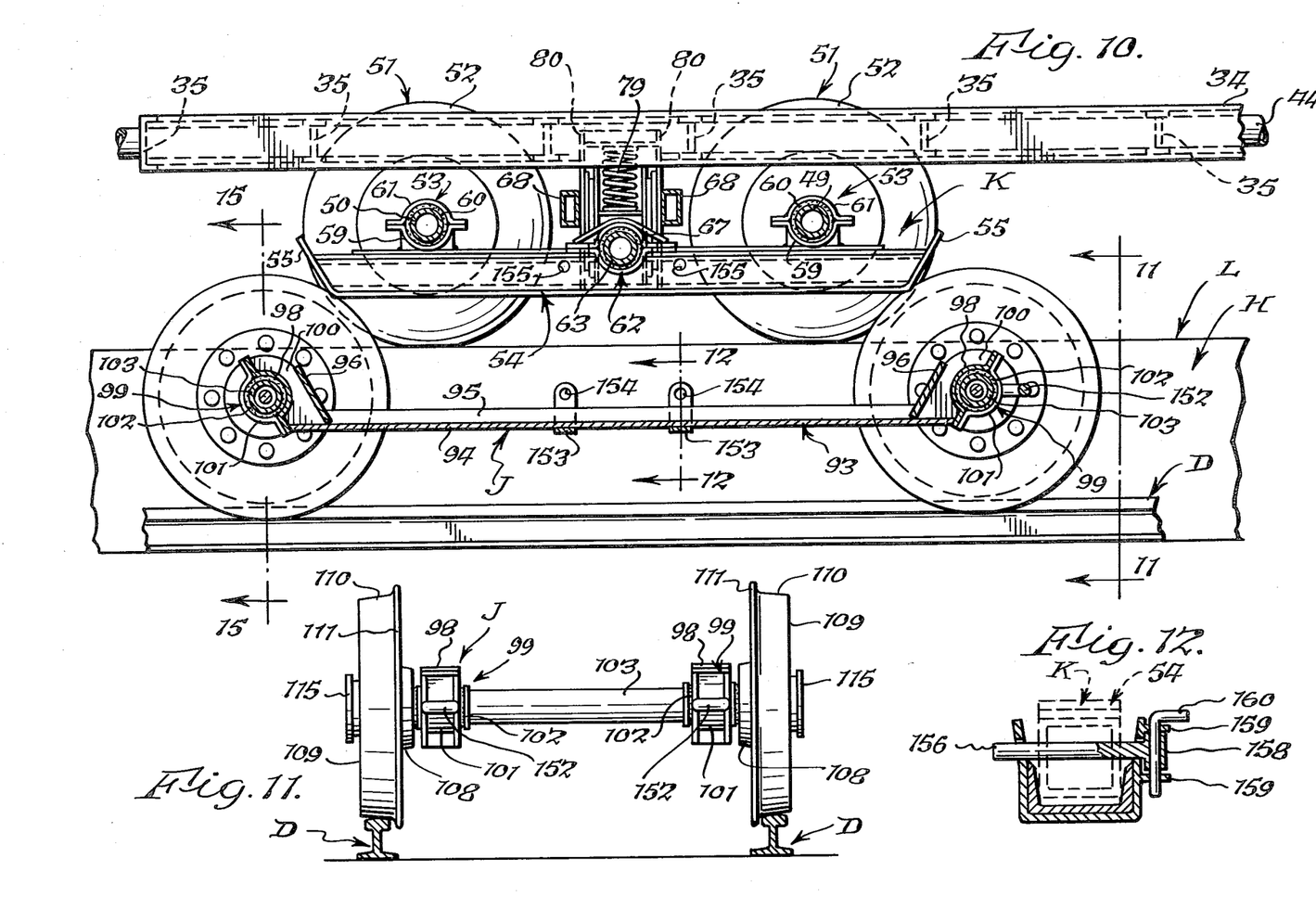
FIG. 10 is a longitudinal sectional view similar to FIG. 6, but showing the railroad truck dropped into the pit free from the highway truck so that the cargo container has been converted to highway service.
FIG. 11 is a view of the front end of the rear railroad truck as viewed from line 11—11, FIG. 10.
FIG. 12 is an enlarged fragmentary vertical section taken on line 12—12, FIG. 10.
Figure 13:
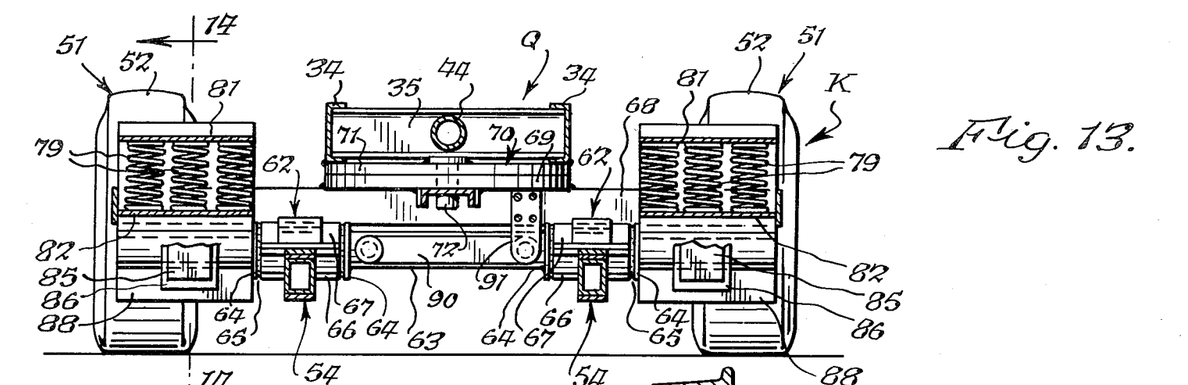
FIG. 13 is a transverse vertical section through the rubber tired highway truck on the road, this section being taken generally on line 13—13, FIG. 6.
Figure 14:
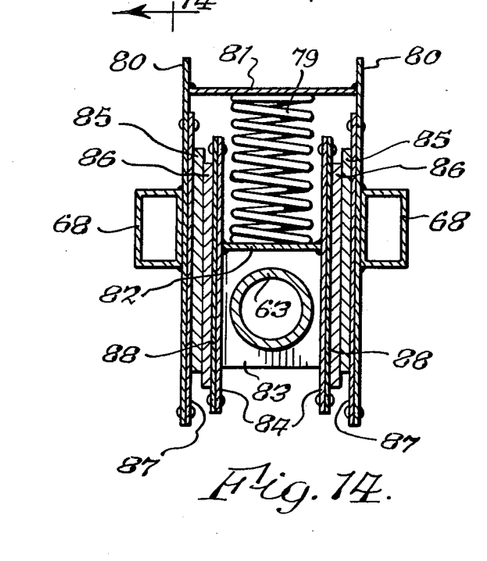
FIG. 14 is an enlarged vertical transverse section taken generally on line 14—14, FIG. 13.

The opposite ends of the cross rod 63 resiliently support the opposite ends of a pair of transversely spaced cross bars 68 which are preferably of rectangular tubular form in cross section, as best shown in FIGS. 10 and 14, and arranged equidistant from and in a horizontal plane above the cross rod 63. These cross bars 68 are connected to and support the lower horizontal round plate 69 of a turn plate structure 70, the upper circular plate 71 of which is fixed to the underside of the main longitudinal side chassis frame bars 34 and cross frame bars 35 of the chassis frame Q in any suitable manner. This turn plate structure can be of standard railroad form with lubricant between the plates 69, 71 and a center pin 72 to hold them coaxial.

Figure 6:
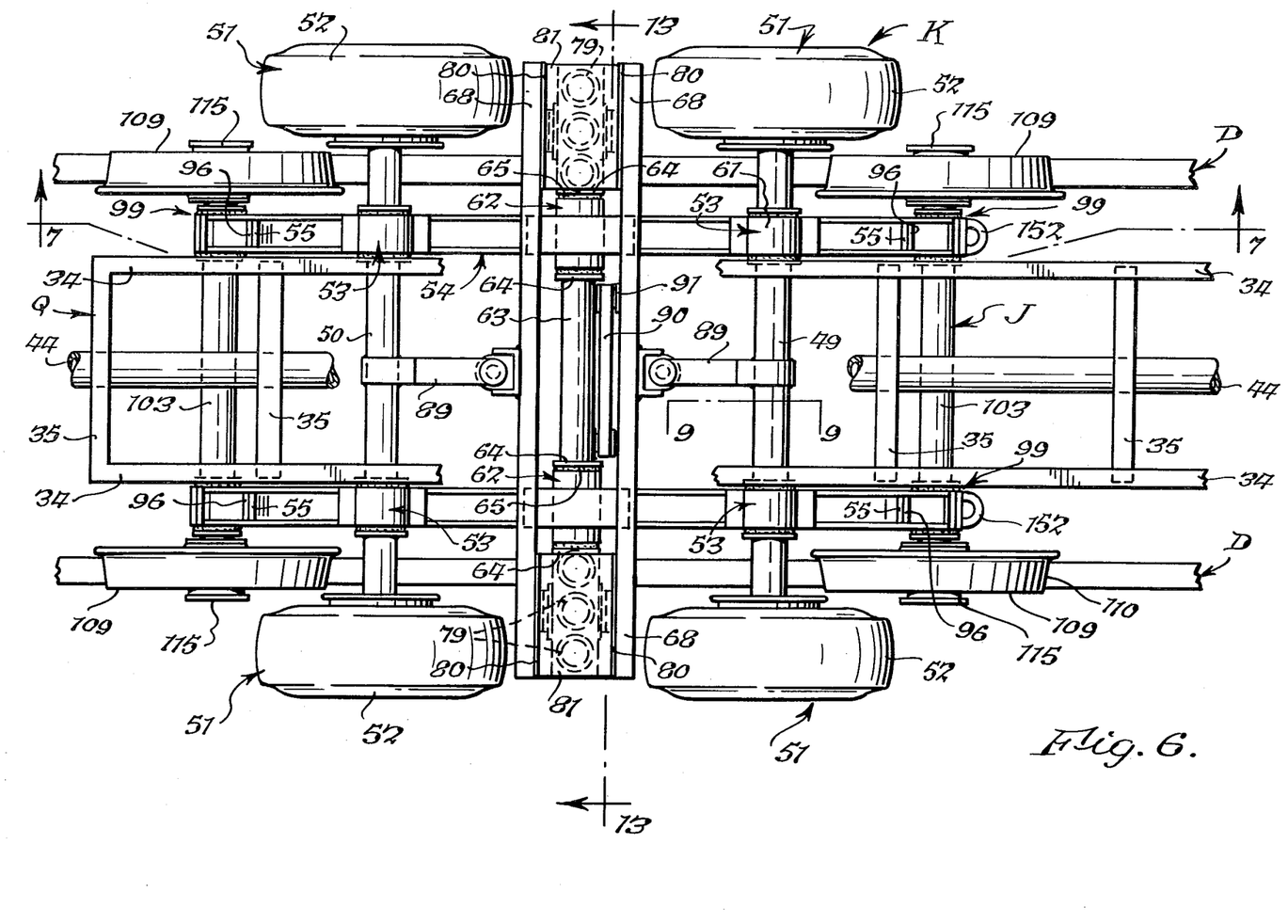
FIG. 6 is a top plan view of the rear railroad truck, the highway truck being shown as nesting in the same. This section is taken on line 6—6, FIG. 1.
Figures 6A, 6B:
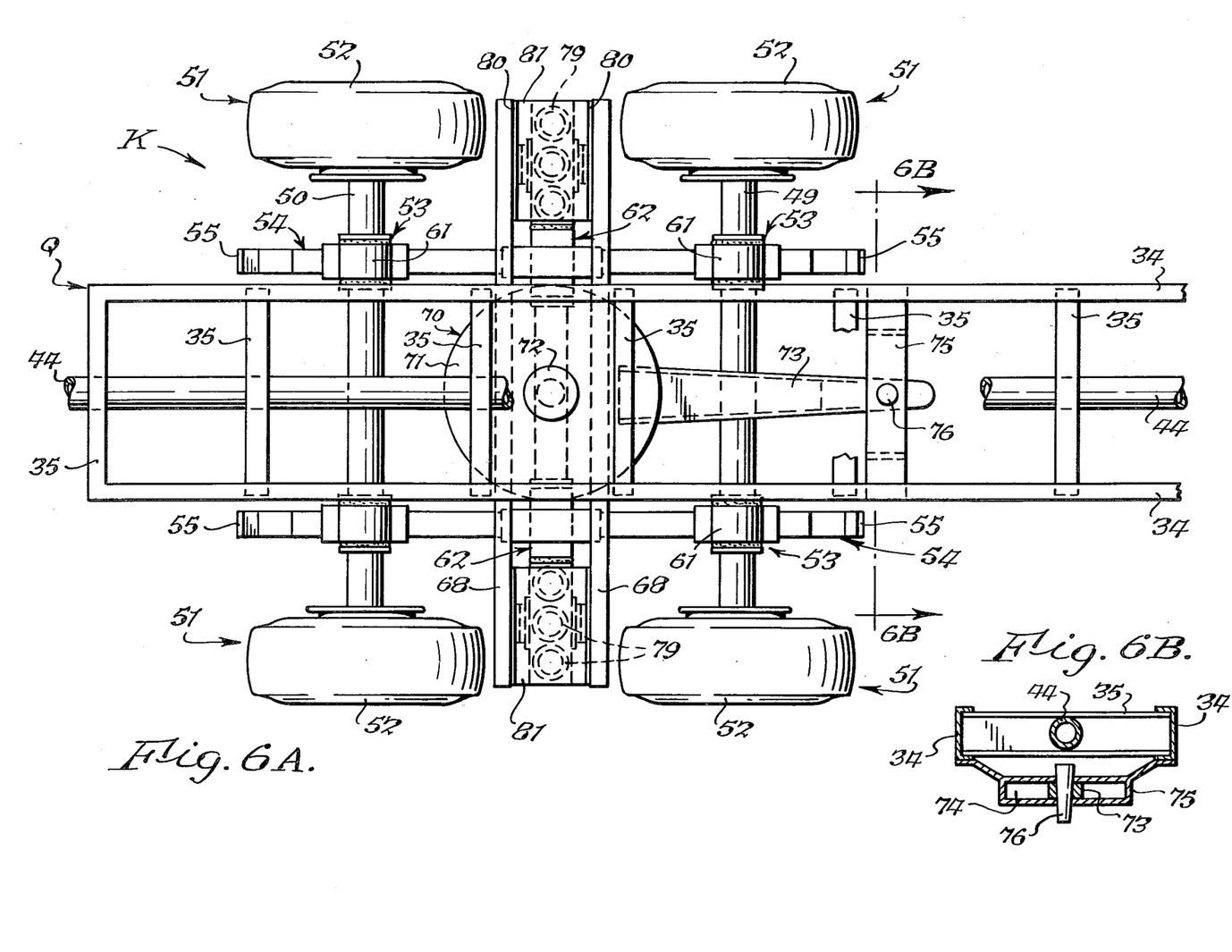
FIG. 6A is a view similar to FIG. 6 taken along line 6A—6A in FIG. 2 but with other parts in section, more specifically, the highway truck being shown alone and its lockable turn plate being featured.
FIG. 6B is a vertical transverse section taken generally on line 6B—6B, FIG. 6A.

This turn plate structure 70, which serves as a swivel means, is only required in railroad service to permit free swiveling of the railroad truck in following the track and switches. This turn plate structure is locked out of service in highway use. To this end, as best shown in FIGS. 6A and 6B, an arm 73 projects horizontally forwardly from the bottom turn plate 69 into the transverse aperture 74 of a horizontally slotted bridge piece 75 secured at its ends to the main longitudinal side frame beams 34 of the chassis frame Q. The turn plate structure 70 is rendered inoperative by means of a tapered pin 76 which serves as a positive latch means removably arranged in registering holes in the top and bottom branches of this bridge piece 75 and in the end of the arm 73, as best shown in FIG. 6B. These holes come into register when the axles 60, 61 are properly aligned for highway service. When brought into such alignment, for highway service, the pin 76 is dropped into these holes to maintain such alignment. This pin is removed for railroad service.

The opposite ends of the cross bars 68 project outwardly from the main longitudinal side chassis bars 34 into the spaces between the tandem wheels 51.

The resilient support for the chassis Q on the cross rod 63 is arranged in these spaces and comprise two rows of helical compression springs 79 extending transversely of the line of movement of the vehicle. To this end, at each side of the chassis, a pair of upright rectangular face plates 80 are welded, in opposing relation to each other, to the opposing faces of the cross bars 68 as best shown in FIG. 14. To the upper ends of each pair of these face plates is welded a horizontal bridge plate 81 which rests on the upper ends of the corresponding array of helical compression springs 79. These plates 80, 81 thereby form a header supported by the springs. The bottoms of these springs are supported by a horizontal rectangular pedestal plate 82 which in turn is welded to the top edges of rectangular vertical plates 83 penetrated by and welded to the cross rod 63. Vertical rectangular face plates 84 are welded to the edges of the plates 82 and 83 in parallel opposed relation to the rectangular face plates 80 carrying the cross bars 68. These plates 82, 83, 84 thereby form a pedestal supporting the springs 79.

The need for shock absorbers, for both railroad and highway use, is eliminated by a pair of friction plates 85 and 86 interposed between each of these face plates 80 and 84 in face-to-face frictional relation to each other. Each friction plate 85 is mounted on a rectangular mounting plate 87 riveted to the sprung face plate 80. The companion friction plate 86 is mounted on a rectangular mounting plate 88 riveted to the unsprung face plate 84. Each of these friction plates 85, 86 are of hardened steel and not lubricated.

Figure 9:
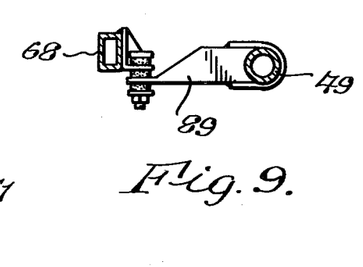
FIG. 9 is a longitudinal fragmentary section taken on line 9—9, FIG. 6.

Conventional torque arms 89 are pivoted for each tandem axle 49, 50. As best shown in FIG. 9, these torque arms are fixed to project transversely and horizontally from each axle 49, 50 and are pivotally secured to the adjacent cross bar 68.

The helical compression springs 79 have no control of lateral movement of the chassis frame Q relative to the axles 49, 50. For such control a horizontal transverse, vertically acting radius rod 90 is pivoted at one end on the side of the cross tube 63 and at its other end on the lower end of a bracket 91 which is fixed to and depends from the corresponding cross bar 68.

REAR RAILROAD TRUCK J—PARTICULARLY FIGS. 6, 7, 10–11 AND 15

To convert to railroad service, the underside of the frame or walking beams of the highway truck K mates with the upper side of the frame or walking beams of the rear railroad truck J, the railroad truck J being dropped off, by gravity, into the pit H when reconverting to highway service.

The frame of each rear railroad truck J comprises essentially two longitudinal side frame members or walking beams 93 which are of channel form in cross section with a bottom wall 94 and shallow side walls 95. The side walls 95 form pockets to receive the main longitudinal side frame beams or walking beams 54 of the rear highway truck K and are spaced apart for this purpose. An inventive feature is that near the ends and within each railroad main longitudinal side frame beam or walking beam 93 are welded upwardly extending transverse plates 96 which diverge upwardly. The divergence and spacing of these plates is such as to fit snugly the end plates 55 of the main longitudinal side frame beams 54 of each highway truck K. By such snug fit, the railroad main longitudinal rear truck side or walking beams can be made very light since they are only in tension and form, in effect, the bottom skin of the highway truck main longitudinal side beams or walking beams 54.

The rear truck railroad main longitudinal side frame bars or walking beams 93 continue beyond these inclined plates 96 and each end of its bottom wall 94 is end welded to the bottom flange of an upper half bearing housing 98 of a rubber bushed bearing 99. Each upper half bearing housing 98 also has a strengthened connection with its frame beam end by an enlargement 100 of the frame beam side walls 95 at their ends, and weldments connecting these enlargements with the opposite edges of the corresponding upper half bearing housing 98.

A companion lower half bearing housing 101 coacts to compress a rubber bushing 102 around a tubular axle housing 103 into compressive relation with each upper half bearing housing 98. Each tubular axle housing 103 supports the two rubber bushed bearings 99 at opposite sides of the rear railroad truck J and extends beyond them to support roller bearings 104 and 105 shown in FIG. 15. These roller bearings are suitably fixed in the bore 106 of the hub 108 of a corresponding metal railroad wheel 109. The rim of this railroad wheel has the conventional conical rolling surface 110 enlarging to the conventional inside conical flange 111.

A very important feature of this invention resides in the employment of a floating axle 112 to compel its two railroad wheels 109 to rotate in unison. With the conventional, conical or tapered wheel rims 110, along with unitary rotation, automatic steering is provided. With such conical or tapered rims 110 providing the rolling surfaces of the railroad wheel rims, the circumference of such rolling surface 110 of each wheel is greater on its inner or flange side, then on its outer or unflanged side. Hence, with the two wheels on each axle tied together for unitary rotation by the floating axle 112, automatic steering along and centering on the rails is a positive feature.

Each floating axle shaft 112 is housed within and projects beyond its axle housing 103. These projecting ends 113 are splined and fit accurately into the splined bores or holes 114 of the wheel hubs 115. Each of these hub components 115 has an annular, radially extending disk or plate 116. Hence, its floating axle 112 can readily be pulled out of the axle housing 103.

Without the floating axles 112, in going around track curves, each railroad wheel 109 would be free to rotate independently of its companion railroad wheel and permit endwise or axial axle movement sufficient to permit contact of wheel flanges 111 with the rails D. This, of course, results in rapid wear of wheel flanges and track, but more important is the likelihood of rail climbing and derailment. Such flange wear gradually flattens the angularity of the conical sides of the flanges 111 facing the rails D. This leads to rail climbing of the wheels 109 and ultimate derailment, if not corrected. Irregular wheel wear can also lead to unbalanced wheels and wheel tramp.

By tieing each pair of wheels 109 together with the floating axle 112, in going around a curve, it prevents one wheel from rotating faster than the other. Hence, the wheel on the outer or longer rail of the curve will have a greater rolling diameter than the wheel on the inner or shorter rail of the curve and thereby will keep the axle assembly centered on the rails as illustrated in FIG. 11.

FRONT RAILROAD DOLLY F—PARTICULARLY FIGS. 16–19

In highway service the front end of each load carrying chassis frame Q is individually carried by a conventional highway tractor C. For railroad service, a front railroad dolly F must be substituted for this highway tractor. Moreover, each front railroad dolly F must be capable of (a) being guided toward and fitted to the front end of each load-carrying chassis frame Q; (b) being latched or coupled thereto; (c) being capable of being latched or coupled to the rear end of each load-carrying chassis frame Q, as well as to the locomotive E, so as to form a train of load-carrying chassis frame Q coupled to a locomotive; (d) transmitting the pulling and braking forces lengthwise of the train; and (e) permitting swivelling of the tandem axles around the vertical central axis of the dolly in rounding curves and switching.

To these ends the frame 120 of each front railroad dolly F has a pair of main longitudinal side frame beams 121 which are of channel form in cross section. These are connected together by a front cross beam 122, and spaced cross beams 123. Two of these spaced center-cross beams carried by the upper plate 124 of a turn plate 125, the center swivel pin 126 of which projects into the center hole of the bottom plate 128 of this turn plate. This turn plate 125 permits swivelling of the tandem axled lower part of the front railroad dolly F in travelling over switches and curves.

Figure 15:
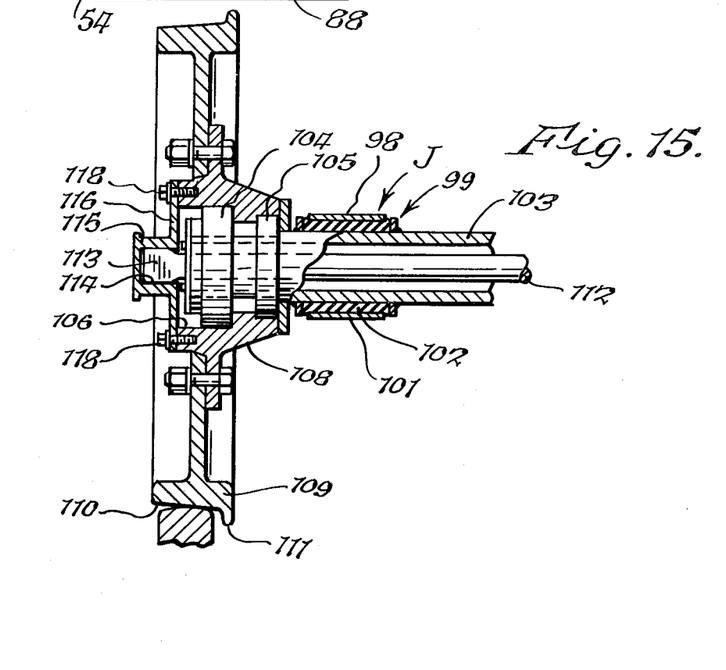
FIG. 15 is an enlarged vertical transverse section through one railroad wheel and its axle housing, this section being taken generally on line 15—15, FIG. 10.

The bottom plate 128 of this turn plate 125 is fixed, through suitable cross beams 129 and longitudinal plates 130, to a tubular cross rod 131 which projects beyond the dolly frame 120. Each end of this cross rod 131 is mounted on the center of a walking beam 132 by means of a rubber bushed bearing 133. Each of these can be similar to the rubber bushed bearings 62 for the rear highway truck K and the description is not repeated. The ends of these walking beams 132 are connected, through rubber bushed bearings 134, to the ends of tubular axle housings 135. These rubber bushed bearings can be the same as the rubber bushed bearings 99 of the rear railroad truck J and the description is not repeated. Each pair of wheels 136 of the front railroad dolly are connected to rotate in unison by a floating axle 138, similar to the floating axle 112, and is mounted on the axle housing 135 by a pair of roller bearings contained within its hub 139. These parts can be identical to those of the rear railroad truck suspension as shown in FIG. 15 and the description is not repeated.

A longitudinal backbone tube 140 extends centrally through the cross beams 122, 123 and is welded thereto. This backbone tube is provided at its front and rear ends with female and male parts of a coupling G identical with the similarly numbered couplings for the load-carrying chassis frame Q with which the parts of this coupling mate.

To render the front railroad dolly F rigidly and easily connectible to the front end of the load-carrying chassis frame Q, its main longitudinal side frame beams 121 are received between the fore-and-aft side plates 36 fixed to the opposite sides of the main longitudinal side frame beams 34 of the load-carrying chassis frame Q.

Also a rearwardly projecting bar or probe 142 is welded in the channel of each main longitudinal side frame beam 121 to project rearwardly therefrom. These enter and fit in flat tubes 143 welded in the forward ends of the main longitudinal side frame beams 34 of the load-carrying chassis frame Q. The ends of these bars or probes 142 are preferably tapered for easy entry and stop collars 144 are welded to the front ends of these probes. These collars butt against the rear ends of the load-carrying chassis main longitudinal side frame beams 34 of the load-carrying chassis frame Q.

To guide the sides of the front railroad dolly F into transversely mating relation with the sides of the chassis frame Q, upright side plates 145, with outwardly flaring rear ends, are welded to the outer side faces of the main longitudinal side frame beams 121 of the railroad dolly frame 120 to project upwardly therefrom. The opposing faces of these side plates engage the sides of the upper fifth wheel plate 42 fixed to the frame of the chassis Q.

SUPPORTING, LATCHING AND CONNECTING DEVICES

Figures 22, 23, 24:
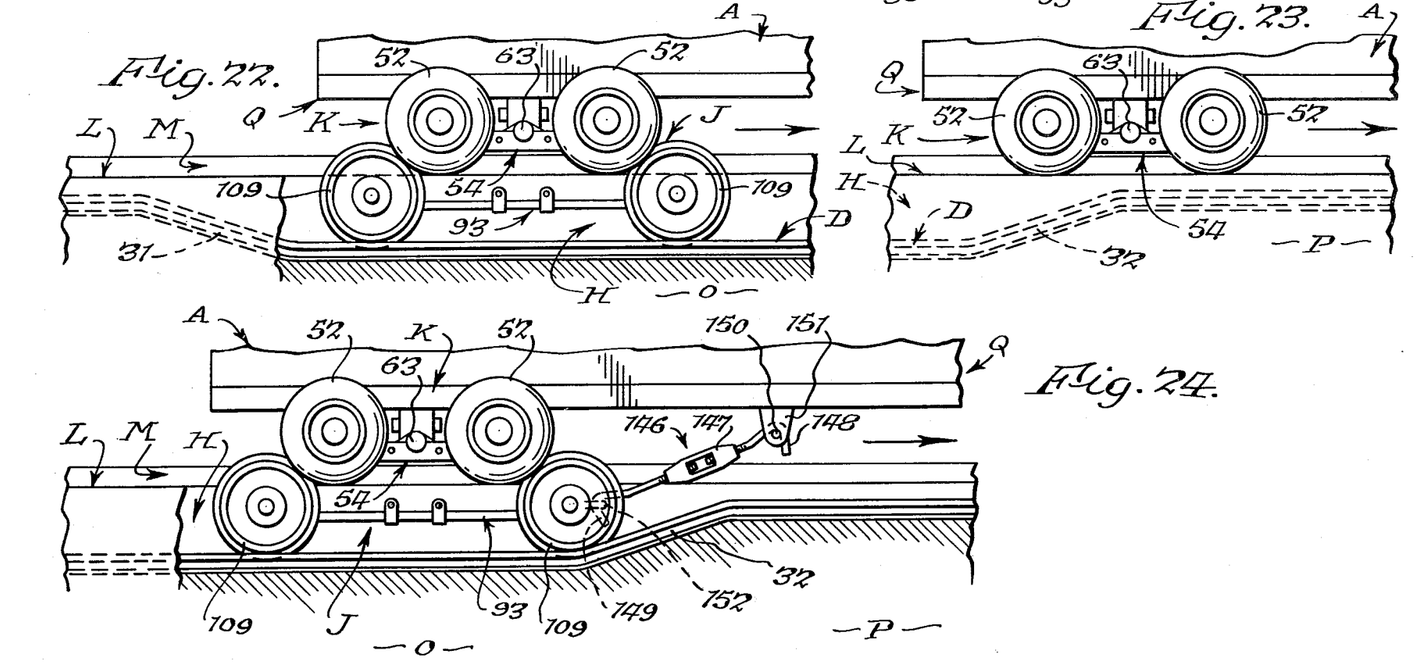
FIG. 22 is a similar view with the railroad wheels dropped fully into the second and lowest stage of the interchange pit and its railroad truck wholly disconnected from the highway truck leaving the cargo carrier free to be drawn off onto the highways.
FIG. 23 is a similar view showing the cargo carrier being drawn along the sides of the third stage of the pit onto the highway.
FIG. 24 is a similar view in the second or lowest stage of the pit, showing the railroad truck connected to and being drawn into mating or interengaging relation with the highway truck for railroad service.

A principal connecting device for effecting interchange from highway to railroad service resides in a removable coupling for connecting the rear railroad truck J to move with the load-carrying chassis frame Q. This is shown in FIG. 24 as a simple double ended hook 146 which can be extensible by means of a turnbuckle body 147 connecting the hooked ends 148 and 149. The front hook 148 hooks over a horizontal cross pin 150 in an U-shaped bracket 151 depending from the load-carrying chassis frame Q (FIG. 24). The rear hook 149 hooks over an eyelet 152 welded to and projecting forwardly from one of the lower half bearing housings 101 of the rear railroad truck J (FIG. 10).

Also, for sidesway and tip-over safety, in railroad travel the main longitudinal side frame beams 34 of the rear highway truck K are capable of being latched in the main longitudinal side frame beams 93 of the rear railroad truck J. For this purpose, as best shown in FIGS. 10 and 12, upwardly opening U-shaped brackets 153 are welded to the undersides of each rear railroad truck main longitudinal side frame beam 93 to provide apertured ears projecting upwardly from opposite sides thereof. Their apertures 154 register with apertures 155 in the highway truck main longitudinal side frame beams or walking beams 54. These apertures receive horizontal pins 156 each having a vertically apertured end head 158 (FIG. 12). Each end head fits between a pair of apertured ears 159, projecting from the corresponding railroad truck main longitudinal side frame beam or walking beam 92. Headed locking pins 160 can be dropped through these apertures.

As previously indicated, the turn plate 70 of the highway truck K is rendered inoperative, during highway service only, by holding the arm 73 of its bottom plate 69 against turning relative to the highway truck frame. This is shown as being done by dropping the pin 76 through vertical holes in the outer end of this arm and the slotted bridge piece 75 of the load-carrying chassis frame Q, when these holes are in register. This is best illustrated in FIGS. 6A and 6B.

Figures 17, 19:
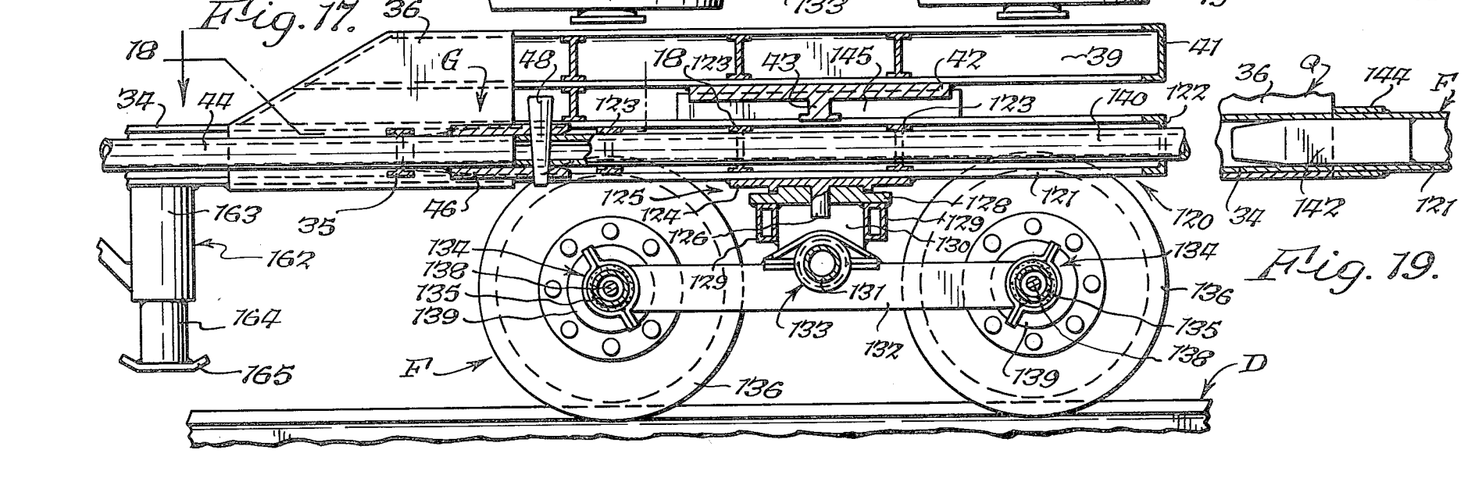
FIG. 17 is a vertical longitudinal section therethrough taken generally on line 17—17, FIG. 16.
FIG. 19 is a vertical section taken generally on line 19—19, FIG. 18.
Figure 18:
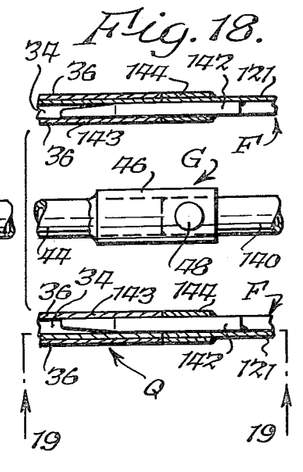
FIG. 18 is a fragmentary horizontal section taken through mating parts connecting the rear end of the railroad dolly with the front end of the frame of the load-carrying chassis, this section being taken generally on line 18—18, FIG. 17.
Figure 20:
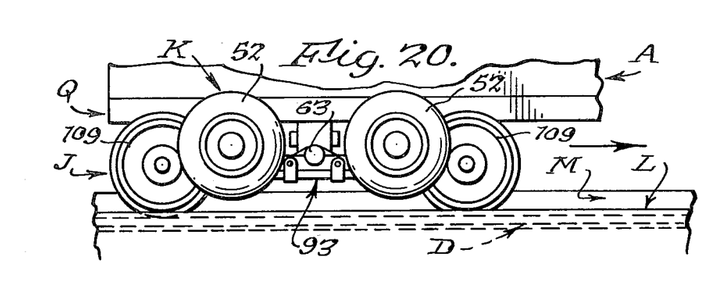
FIG. 20 is a fragmentary side elevation of the rear end of the cargo carrier with its rubber tired highway truck nested in a railroad truck traveling along the railroad track.

Present higway trailers (not shown) are provided with retractable legs to support the front end when attaching it to or detaching it from a highway tractor. Such must also be provided for the front end of the chassis frame Q for alternate attachment or detachment with either a highway tractor C or railroad dolly F. Such is illustrated in FIG. 17 as a vertical telescoping leg 162 having its upper part 163 fixed to and depending from each side of the chassis frame Q in a position above the curb 164 of the driveway L. Its lower part 164 is provided with a foot 165 extensible downwardly to engage this driveway.

OPERATION—INTERCHANGING SERVICES

Figure 1:
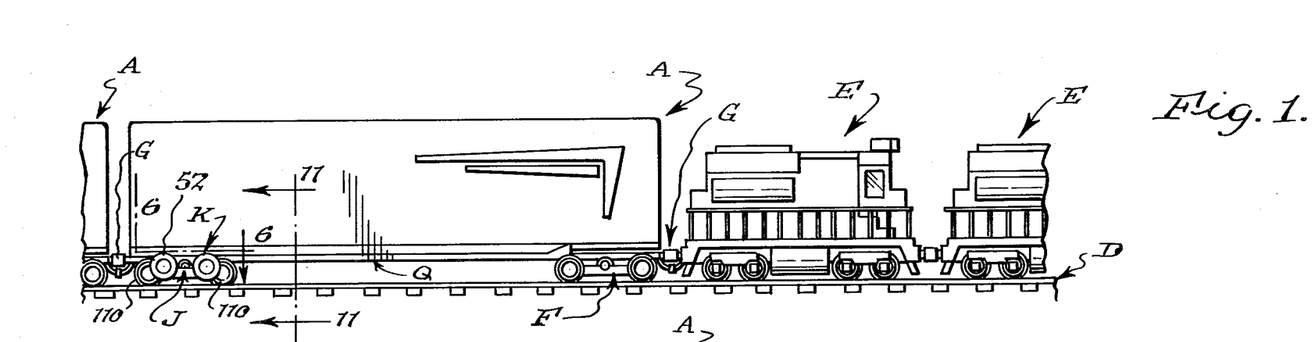
FIG. 1 is a side elevational view of diesel railroad locomotives pulling cargo containers along a railroad track, the cargo containers being mounted on rear railroad trucks and front railroad dollies for this purpose.
Figures 2, 3:
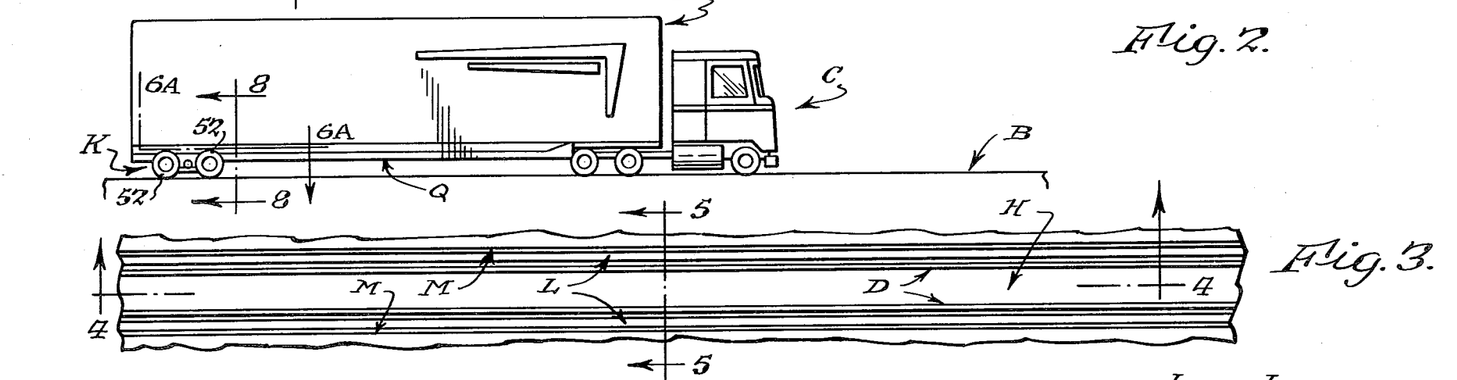
FIG. 2 is a similar view showing a conventional highway tractor pulling one of the cargo containers along a highway, the tractor having a conventional fifth wheel supporting the front end of the cargo container. Its rear end is supported by a rubber tired highway truck.
FIG. 3 is a top plan view of a track siding arranged in a pit in which the interchange in railroad-highway service is effected. A highway track is arranged above and straddles this pit.
Figure 4:
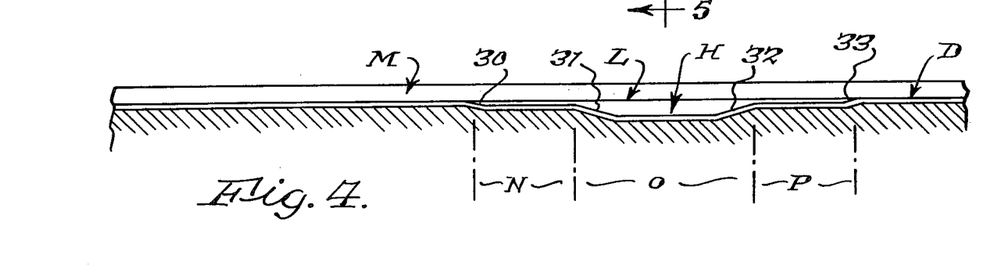
FIG. 4 is a vertical longitudinal section through this pit taken generally on line 4—4 on FIG. 3.

Assuming a train of the cargo carriers to be in railroad service as shown in FIG. 1, the chassis frame Q of each container or body A is supported at its front end on a front railroad dolly F and at its near end, through its spring suspension, on the rubber tired highway truck K, which is in turn nested in a rear railroad truck J. These parts are stabilized for sidesway control by having the main longitudinal side frame beams or walking beams 54 of the highway truck K pinned in the main longitudinal side frame beams or walking beams 94 of the rear railroad truck J. This is effected (FIG. 12) by the locking pins 156 which are in turn held against falling out by individual small locking pins 160. All these pins are removed just before the conversion to highway service takes place, and are reinserted just after conversion to railroad service has taken place.

In such railroad service on the track D the central longitudinal backbone tubes 44 of the chassis frame Q for each container or body A is coupled at its rear end, via a coupling G, to the front end of the central longitudinal backbone tube 140 of the next following front railroad dolly F. The front end of the central longitudinal backbone tubes 44 of the chassis frame Q for each container or body A is connected at its front end, via a similar coupling G, to the rear end of the central longitudinal backbone tube 140 of the next forward front railroad dolly F. The front end of the central longitudinal backbone tube 140 of the leading front railroad dolly F is coupled, via a similar coupling G to the rear end of a locomotive E. The pins 48 for these couplings G, are removed when converting to highway service. It will be seen that the end coupled backbone tubes 44, 140 form, in a railroad train, a continuous backbone from one end of the train to the other.

In converting from such railroad to highway service, the train is drawn off onto a siding including the pit H with its highway and railroad tracks L and D. The pins 48 of the couplings G are then removed to free the backbone tubes 44, 140 of the load-carrying units of the train as well as the locomotives E which are driven off.

The various railroad wheeled containers or bodies A are now disconnected and can be assembled as desired by means of a yard locomotive or small tractor. This yard locomotive can also be used to remove each front railroad dolly F. For this, the pin 48 is pulled out of the coupling G at the rear end of the front railroad dolly F to be removed, so as to disconnect this dolly from its load-carrying chassis frame Q. The removal of this dolly is done by lowering the telescoping legs 162 of the load-carrying chassis frame Q; connecting the coupling G between the yard locomotive and the front railroad dolly F to be removed; and hauling it away.

A conventional highway tractor C (not shown) is then backed on the driveway L along the track D under the elevated front end of the load-carrying chassis frame Q. As it does so its greased inclined fifth wheel plate (not shown) engages the fifth wheel plate 42 of the load-carrying chassis frame Q and is brought into a horizontal face-to-face relation therewith. At the same time the pin 43 is latched to the catch of the highway tractor fifth wheel. The tractor now hauls the load-carrying chassis frame Q along the track D toward the pit H, the rear end of this chassis frame Q being supported by both the interengaged highway and railroad trucks K and J in the manner shown in FIG. 7.

Figure 7:
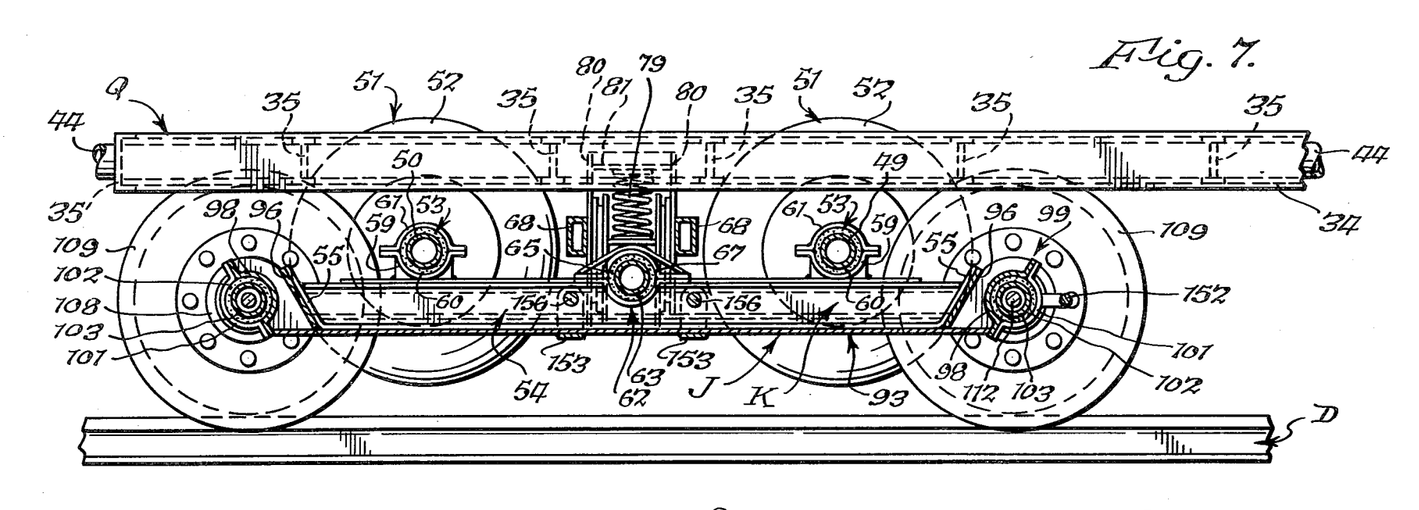
FIG. 7 is a vertical longitudinal section through the interengaged railroad and highway trucks, this section being taken generally on line 7—7, FIG. 6.
Figure 8:
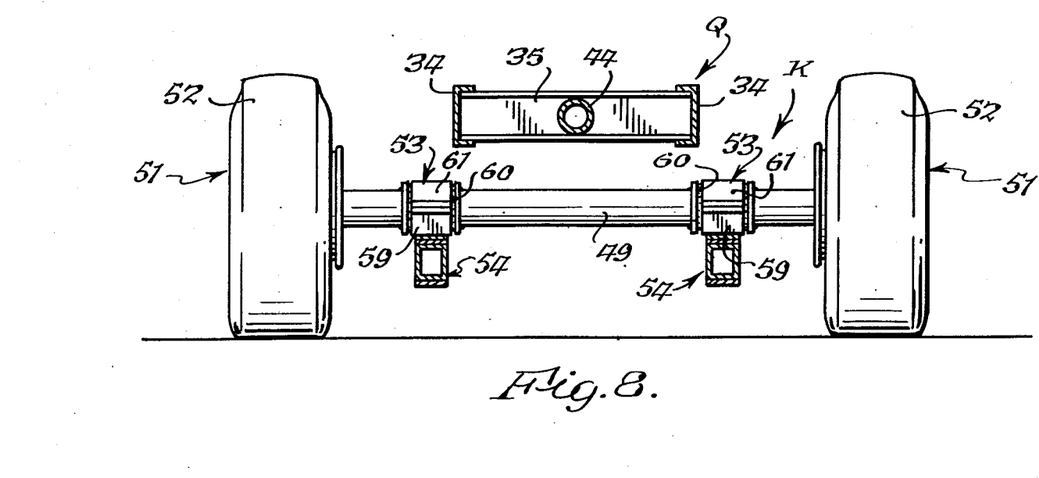
FIG. 8 is a vertical transverse section through the rubber tired highway truck only, this section being taken generally on line 8—8, FIG. 2.

The pins 160, 156, FIGS. 7 and 12, are now removed so as to free the main longitudinal side frame or walking beams 54 and 93 from one another and hence unlock the rear railroad truck J from the highway truck K.

Figure 21:
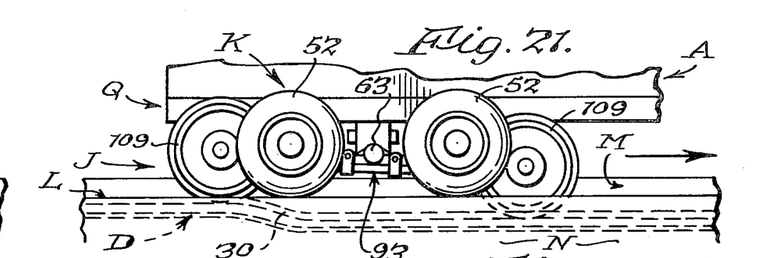
FIG. 21 is a similar view with the flanged railroad wheels dropping into the first stage of the interchange pit.

As the highway tractor C pulls over the entering end of the pit H, the front railroad wheels 109 and the rear railroad wheels 109 of the rear railroad truck J ride down the entering down ramp 30 onto first horizontal track section N, as illustrated in FIG. 21. As it pulls forward, the rear railroad wheels 109 of this rear railroad truck J are also brought onto this horizontal track section N. Coming to this position the rubber tried highway wheels 51 are brought into contact with the tracks L flanking the railroad track D. However, there is no substantial load transfer to the highway wheels 51. This first stage of separation of the rear railroad truck J from the highway truck K is important in obtaining a gravity separation of them.

At this point the arm 73, FIGS. 6A and 6B, extending from the lower plate 69 of the turn plate 70 can be swung to bring its end hole into register with the holes in the bridge piece 75 of the chassis frame Q. The pin 76 is then dropped through these holes so as to render the turn plate 70 inoperative. This turn plate is essential for railroad operation in traveling over curves and switches. However, in highway travel this turn plate would cause loss of control in tracking since the highway truck K would be free to turn in any direction.

The highway tractor C now pulls the partly disconnected rear railroad and highway trucks J and K down the second down track ramp 31 (FIG. 22) onto the second and lowest travel level O. In this position the rear railroad truck K is wholly free and the highway tractor C can pull the permanently coupled body A and highway truck K out on the highways for usual highway operation.

The rear railroad truck J left in the bottom of the pit H can be removed by a small tractor or in any other manner.

To convert to railroad operation, the rear railroad truck J is replaced in the bottom of the pit H, station O, and a front railroad dolly F is placed on another portion of the yard tracks. The highway tractor C with its trailer body Q supported on the rubber tired highway truck K is brought along the track D to the inlet end of the pit H. The highway tractor C then pulls its trailer so that the highway truck K is directly above the rear railroad truck J so preplaced in the lowest section O of the pit. The double-ended hook 146, FIG. 24, is then connected. Its front hook 148 is placed over the cross pin 150 of the chassis frame Q and its rear hook 149 is placed in the eye 152 projecting from the adjacent lower half bearing housing 101 or its axle housing 103 of the rear railroad truck J. The highway tractor C now moves forwardly. This causes the railroad wheels 109 of the rear railroad truck J to ride up the third ramp 32, which is an up-ramp, onto the length of track at station P which is at the same elevation as the first depressed length of track (station N). In going up the ramp 32 the main longitudinal side frame beams or walking beams 54 of the highway truck K are brought into nested relation with the main longitudinal side frame beams or walking beams 93 of the rear railroad truck J. Any substantial dislocation of these trucks longitudinally relative to each other will be corrected by the downwardly converging end plates 55 and 96 at the ends of the frame beams. Thus, the rear railroad truck K can be a substantial distance forwardly or rearwardly from being directly under the highway truck K. The double-ended hook 146 corrects such mispositioning and any minor mispositioning will be corrected by the downwardly converging plates 55 and 96 at the ends of the highway and railroad truck main longitudinal side frame beams or walking beams 54 and 93.

With such positioning, the pins 156 can be inserted through the holes 155 through these main longitudinal side frame beams 54 (FIG. 12) and the brackets 153 of the main longitudinal side frame beams of the rear railroad truck J. The pins 160 can then be inserted to prevent the pins 156 from shaking out. This provides a safe connection against destructive sidesway or tip-over in railroad operation since the spacing of the effective spring centers are increased from those of the railroad truck J to those of the highway truck K. Also, the pin 76 (FIGS. 6A and 6B) is pulled out to release the arm 73 and render the turn plate 70 operative. This permits the rear railroad truck J and highway truck K to swivel around railroad curves and switches.

The highway tractor C now pulls the trailer up the up-ramp 33 at the outlet end of the pit H onto the normal level of track D. This transfers the load onto the rear railroad truck J.

The double-ended hook 146 is then removed and the telescopic legs 162 extended downardly to hold the front end of the trailer elevated.

The front railroad dolly F is now backed, by a yard locomotive or small tractor, along the track D under the front elevated end of the load-carrying chassis frame Q. In doing so, the upstanding side guide plates 145 (FIGS. 16 and 17) engage the outer edges of the top fifth wheel plate 42 fixed to the underside of the elevated front end of the chassis frame Q. This guides the probes or projecting bars 142 into the openended tubes 143 welded to the chassis frame Q, this movement being stopped by the abutment sleeves 144. This movement also causes the rear end of the central backbone tube 144 of the railroad dolly F to enter the sleeve 46 of the coupling G welded to project from the rear end of the backbone tube 44 of the chassis frame Q. This coupling G is completed by the insertion of the tapered pin 48.

The telescopic leg 164 is now withdrawn upwardly. The container body A and its chassis frame Q are now fully railroad wheeled and is in condition for railroad travel. It is accordingly assembled into a train of similar vehicles which are joined together and to a locomotive E by the couplings G.

OPERATION—THE SPRING SUSPENSION

The suspension contained in the rear highway truck K is adapted for both highway and railroad service with light or heavy loads assuming the conversion to railroad service, as described immediately above, the upward movement of, say, a front railroad wheel 109 raises the corresponding end of its axle housing 103 and, through its rubber bushed bearing 99, the front end of its frame walking beam 93 since the frame walking beam 54 of the rear highway truck K is nested in this railroad truck frame walking beam 93, the front end of the highway truck walking beam 54 is also lifted.

This upward movement of the forward end of this walking beam 54 raises the rubber bushed bearing 62, and the corresponding end of the cross rod 63. The rubber bushing 65 for this bearing is of sufficient radial thickness to permit the required rocking of the walking beam 54 and provides a frictionless bearing which is free from lubrication requirements. The rubber bushed bearings 62 at the outer ends of the cross rod 63 hold the walking beams at the outer ends of the cross rod, but in the event of extreme horizontal lateral force, particularly when the vehicles are coupled together in a train, the radius rod 90 (FIGS. 6 and 13) between the cross rod 63 and the cross bar 68 of the chassis frame Q provides a positive stop. The radius rod 90 is arranged alongside and parallel with the cross rod 63 and is connected thereto by a pivot, the axis of which extends lengthwise of the line of travel and a second pivot 91, parallel to the first, connecting the other end of the radius rod with the container.

The upward movement of this one end of the cross rod 63 raises the corresponding pedestal plates 82, 83 (FIGS. 13, 14) to distort upwardly the array of helical compression springs 79. This force is transmitted to the chassis frame Q through the top and side plates 81, 80 of the header containing the springs. These side plates 80 are welded to the opposing vertical faces of the pair of cross bars 68 forming part of the chassis frame Q which carries the cargo container or body A.

A pair of hardened steel plates 86, 85, in face-to-face sliding relation to each other, are respectively secured to the side plate 84 of each pedestal and side plate 87 of each header. These provide friction particularly desirable for railroad travel and eliminate the need for shock absorbers. This friction increases on rough roads, as the longitudinal pressure increases on rough roads, this being a desirable feature. Rough roads require more control of the vertical forces.

FEATURES

It will be seen that the highway truck K is of normal size and of time-tested walking beam construction. Its rubber bushed bearings 53 and 62 and friction-free helical compression springs 79 have been proved in extensive heavy duty highway service. The friction plates 85, 86 eliminate the need for shock absorbers, particularly in railroad service. The highway wheels can be single or dual tired. Standard on highway tractors C, conventional fifth wheel trailer mounts can be used so that they can be used for purely highway trailers when not in the convertible service described herein.

It will also be seen that the railroad truck K is completely eliminated in highway service so as not to detract from the legally prescribed highway payload. Also, it is very lightweight, its frame walking beams 93 forming, in effect, merely a tension skin for the highway truck main longitudinal side frame beams 54. Also, the railroad frame 54 is very low and compact so that they can readily be shipped back to container staging areas. The railroad wheels 109 are connected to the axle housings 103 by roller bearings 104, 105 and the floating axles 112 therein insure that each pair of railroad wheels rotate in unison to minimize flange and track wear at curves and switches. Such flange wear decreases the angularity of the conical face of the flange facing the rail. This leads to rail climbing and derailment, if not corrected. In this, the outer wheels greater rolling circumference in rounding curves, moves it ahead to steer the pair of wheels to the centered relationship shown in FIG. 15.

In railroad service the railroad and highway trucks J and K are pinned together by the pins 156 for sidesway and tip-over safety. These are readily removed to permit the railroad truck to be dropped free from the highway truck. Also, the turn plate 70 is made operable in railroad service so that the railroad truck can swivel on curves and switches. This turn plate is rendered inoperative in highway service by pinning its arm 73, FIGS. 6A and 6B, to the chassis frame Q.

A principal feature is, of course, in the elimination of lifting devices, such as jacks, lift trucks and cranes, and providing a simple ramp and pit means to effect gravity separation and mating of the railroad and highway truck frames J and K in converting from one service to the other. Going down the down ramps 30 and 31 permit gravity separation of each railroad truck J from its highway truck K. Reassembly is easily effected by use of the hook or chain 146 in going up the up-ramps 32 and 33. Either the highway tractor C or a yard locomotive can be used to effect such changeover. Of course, the ramps and difference in railroad track levels could be provided by an elevated structure instead of a pit.

It will also be noted that the front railroad dolly F is adapted to be easily coupled and latched to the chassis frame Q and provide reliable front end support for this chassis frame and its cargo container A.

Both this chassis frame Q and the railroad dolly F has a central backbone tube 44, 140 which tubes are end coupled, in alternation, to provide a central backbone extending the full length of the railroad train. Each backbone tube is reinforced against collapse in switching and train coupling operations by being welded to cross beams, which they penetrate, and which cross beams are, in turn, welded to main longitudinal side frame beams.

It will be noted from FIG. 1 that the backbone tubes 44 and their ends of the couplings G extend but a short distance rearwardly from the bodies A supported by the chassis frames Q. This avoids interference with loading and unloading operations. Such possible interference can be still further reduced by shortening each backbone tube 44 so that its rear end coupling part G is wholly under the chassis frame Q and lengthening each backbone tube 140 so that it projects further forwardly from the railroad dolly F. This further projection is of little consequence since the railroad dolly F is always in railroad service and handled by railroad hands.

In being hauled along the highway, the trailer composed of the units K and A also has the "feel" of a conventional highway trailer.

As previously stated, the designations "front" and "rear" refer to the line of travel.

What is claimed is:

1. A system for the combined transportation of a cargo by highway and railroad comprising a container for carrying cargo, first axle means permanently connected to said container, rubber tired highway wheels supporting said first axle means, second axle means, railroad wheels supporting said second axle means, and interengaging means for selectively mounting and dismounting said first axle means on said second axle means, said interengaging means comprising a first frame means on said first axle means, and a second frame means on said second axle means, said first frame means being in contacting nested relation to said second frame means to be restrained against horizontal movement in all directions but being free to be lifted vertically therefrom, whereby said first frame means can be lifted from said second frame means and lowered into mating relation therewith to move as a unitary frame structure along the railroad tracks.

2. The combination set forth in claim 1 additionally including spring means on said first axle means supporting said container whereby the spring mounting of said container is provided by said spring means when said first axle means are mounted on said second axle means, said spring means comprising substantially the sole spring support for both highway and railroad travel.

3. The combination set forth in claim 1 wherein said first frame means includes main longitudinal side frame bars, and wherein said second frame means includes main longitudinal side frame members severally arranged under and severally nestingly support the main longittudinal side frame bars of said first frame means.

4. The combination set forth in claim 1 wherein said first frame means includes main longitudinal side frame bars each having its opposite ends angled to provide jointly downwardly facing wedge faces, and wherein said second frame means includes main longitudinal side frame members arranged under and severally supporting said main longitudinal side frame bars and each having its opposite ends angled to provide upwardly facing wedge faces engaging said first wedge faces, the angularity of all of side wedge faces being such as to move said frame means longitudinally with reference to each other when said main longitudinal side frame bars are dropped onto said main longitudinal side frame members, in the event said main longitudinal side frame bars are not positioned longitudinally directly above said main longitudinal side frame members.

5. The combination set forth in claim 4 wherein said wedge faces of said main longitudinal side frame bars have snug fit within said wedge faces of said main longitudinal side frame members whereby said main longitudinal side frame members form bottoms in tension for said main longitudinal side frame bars so that both can be of lighter weight construction.

6. The combination set forth in claim 1 wherein said first frame means includes swivel means permitting said first axle means to turn relative to said container around a central vertical axis throughout all railroad travel and thereby permit said first axle means to follow freely switches and curves in the railroad track, and wherein positive latch means are provided for fixedly locking said swivel means against all turning movement throughout all highway travel to prevent said first axle means from veering from one side of the highway to the other.

7. A system for the combined transportation of a cargo by highway and railroad comprising a container for carrying cargo, first axle means permanently connected to said container, rubber tired highway wheels supporting said first axle means, second axle means, railroad wheels supporting said second axle means, interengaging means for selectively mounting and dismounting said first axle means on said second axle means, said interengaging means comprising a first frame means on said first axle means and a second frame means on said second axle means, and means mounting said first frame means on said second frame means, and wherein said first axle means is in the form of a pair of tandem axles and wherein a walking beam means is arranged at each side of said first frame means, a bearing is provided between each axle end of said first axle means and the corresponding end of said walking beam means, a horizontal cross rod means extends transversely of the line of travel, means support said container on said cross rod means, and a bearing is provided between the center of said walking beam and the corresponding end of said cross rod.

8. The combination set forth in claim 7 wherein each of said bearings includes a rubber bushing which twists to provide the required rocking bearing movement.

9. The combination set forth in claim 7 wherein a vertically acting spring suspension is interposed between each cross rod end and said container.

10. The combination set forth in claim 9 wherein a radius rod is arranged alongside and parallel with said cross rod and is connected thereto by a pivot, the axis of which extends lengthwise of the line of travel and a pivot having an axis parallel with said first axis connecting the other end of said radius rod with said container.

11. A system for the combined transportation of a cargo by highway and railroad comprising a container for carrying cargo, first axle means permanently connected to said container, rubber tired highway wheels supporting said first axle means, second axle means, railroad wheels supporting said second axle means, interengaging means for selectively mounting and dismounting said first axle means on said second axle means, said interengaging means comprising a first frame means on said first axle means and a second frame means on said second axle means, and means mounting said first frame means on said second frame means, and additionally including railroad track means for carrying said railroad wheels, roadway track means straddling said railroad track means, said roadway track means being at a higher elevation then said railroad track means whereby said first frame means can be placed in overlaying straddling relationship to said second frame means, up-ramp means for moving said second frame means toward said higher elevation, and moving means for moving said first and second frame means in unison whereby said second frame means can be moved up said up-ramp means into interengaging supporting relationship with said first frame means for carrying said container on said railroad track means.

12. The combination set forth in claim 11 wherein said moving means comprises means for connecting said container to said second axle means.

13. The combination set forth in claim 11 wherein said up-ramp means is in two stages with a generally horizontal stretch of said railroad track means between said stages.

14. A system for the combined transportation of a cargo by highway and railroad comprising a container for carrying cargo, first axle means permanently connected to said container, rubber tired highway wheels supporting said first axle means, second axle means, railroad wheels supporting said second axle means, interengaging means for selectively mounting and dismounting said first axle means on said second axle means, said interengaging means comprising a first frame means on said first axle means and a second frame means on said second axle means, and means mounting said first frame means on said second frame means, and additionally including railraod track means for carrying said railroad wheels, roadway track means straddling said railroad track means, said roadway track means being at a higher elevation than said railroad track means whereby said first frame means can be placed in overlaying straddling relationship to said second frame means, down ramp means for moving said second frame means toward said lower elevation and moving means for moving said interengaged first and second frame means in unison down said down ramp means to drop free from said first frame means.

15. The combination set forth in claim 14 wherein said down ramp means as in two stages with a generally horizontal stretch of said railroad track means between said stages.

16. The combination set forth in claim 14 additionally including up-ramp means for moving said second frame means toward said higher elevation whereby said second frame means can be moved up said up-ramp means by said moving means into interengaging supporting relationship with said first frame means for carrying said container on said railroad track means.

17. A system for the combined transportation of a cargo by highway and railroad comprising a container for carrying cargo, first axle means permanently connected to said container, rubber tired highway wheels supporting said first axle means, second axle means, railroad wheels supporting said second axle means, interengaging means for selectively mounting and dismounting said first axle means on said second axle means, said interengaging means comprising a first frame means on said first axle means and a second frame means on said second axle means, and means mounting said first frame means on said second frame means, said first axle means being in the form of a pair of tandem axles, a member arranged at each side of said first frame means and extending longitudinally of the line of travel, a bearing provided between each axle end of said first axle means and the corresponding end of said longitudinally extending member, horizontal journal means extending transversely of the line of travel, means supporting said container on said journal means, and a bearing provided between the center of each longitudinally extending member and said journal means.

18. A system for the combined transportation of a cargo by highway and railroad, comprising a container for carrying cargo, first axle means permanently connected to said container, rubber tired highway wheels supporting said first axle means, second axle means, railroad wheels supporting said second axle means, a first frame means on said first axle means, a second frame means on said second axle means, said first axle means having tandem axles and said second axle means having spaced front and rear axles parallel with and in farther spaced relation than said tandem axles, said first frame means being of such size as to enter the space between said railroad wheels so as to be capable of moving vertically into and out of supporting relation to said second frame means.

19. The combination set forth in claim 18 wherein said first frame means is also of such size as to fit into the space defined by said second axle means.

20. The combination set forth in claim 19 wherein, when said first and second frame means are in such supported relation, the horizontal plane of the axes of said first axle means is above the horizontal plane of the axes of said second axle means.

21. The combination set forth in claim 18 wherein, when said first and second frame means are in such supported relation, the tandem axles of said first axle means are each in closely spaced relation to the rims of said railroad wheels.

22. The combination set forth in claim 18 wherein, when said first and second frame means are in such supported relation, said rubber tired wheels are arranged in freely suspended relation exteriorly of said railroad wheels whereby said railraod wheels and rubber tired highway wheels can simultaneously engage a railroad track and a highway straddling said railroad track.

23. A system for the combined transportation of a cargo by highway or railroad comprising a container for carrying cargo, first axle means permanently connected to said container, rubber tired highway wheels supporting said first axle means, second axle means, railroad axles supporting said second axle means, railroad wheels supporting said second axle means, and interengaging means for selectively mounting and dismounting said first axle means on said second axle means, said interengaging means comprising a first frame means on said first axle means, a second frame means on said second axle means, the under surface of said first frame means being in close face-to-face mating relation with the upper surface of said second frame means to provide a unitary highway and railroad frame structure, and releasable means restraining said first frame means against horizontal movement in all directions with reference to said second frame means.

24. The combination set forth in claim 23 additionally including a latch for locking said first and second frame means against separation vertically from each other.

* * * * *